United States Patent [19]

Bartenbach et al.

[11] Patent Number: 4,699,467

[45] Date of Patent: Oct. 13, 1987

[54] ARRANGEMENT FOR ILLUMINATING A ROOM WITH DAYLIGHT

[75] Inventors: Christian Bartenbach, Munich, Fed. Rep. of Germany; Martin Möeller, Rum; Rudolf Lanzenberger, Innsbruck, both of Austria

[73] Assignee: Siemens Aktiengesellschaft, Berlin and Munich, Fed. Rep. of Germany

[21] Appl. No.: 857,042

[22] Filed: Apr. 29, 1986

[30] Foreign Application Priority Data

Apr. 30, 1985 [DE] Fed. Rep. of Germany ....... 3515603

[51] Int. Cl.[4] ........................ G02B 17/00; G02B 27/00

[52] U.S. Cl. .................................................... 350/259

[58] Field of Search ............................... 350/259-264; 49/64

[56] References Cited

U.S. PATENT DOCUMENTS

| | | | |
|---|---|---|---|
| 717,782 | 1/1903 | Wadsworth | 350/261 |
| 720,386 | 2/1903 | Wadsworth | 350/260 |
| 721,256 | 2/1903 | Wadsworth | 350/262 |
| 721,259 | 2/1903 | Wadsworth | 350/262 |
| 755,196 | 3/1904 | Wadsworth | 350/260 |
| 4,292,763 | 10/1981 | Barnes et al. | 49/64 |
| 4,351,588 | 9/1982 | Zullig | 350/259 |
| 4,509,825 | 4/1985 | Otto et al. | 350/259 |
| 4,634,222 | 1/1987 | Critten | 350/263 |

FOREIGN PATENT DOCUMENTS

| | | |
|---|---|---|
| 194867 | 3/1938 | Fed. Rep. of Germany . |
| 1497348 | 9/1969 | Fed. Rep. of Germany . |

*Primary Examiner*—Richard A. Wintercorn

*Attorney, Agent, or Firm*—Hill, Van Santen, Steadman & Simpson

[57] ABSTRACT

The daylight enters the room through at least one inner light port which is limited at the top by a flat upper reflector and at the bottom by a parabolic lower reflector. A diagonal beam having a diagonal angle passes through the upper edge of the inlet window and through the lower edge of the inner window. All of the light entering through the light port is emitted into the room above the diagonal beam. To accomplish this, the lower reflector represents, in cross-section, part of a parabola whose main axis passes through the upper edge of the inlet window, and which forms with the vertical an upwardly directed main axis angle. Also, the angle of inclination measured from the main axis of the upper reflector is equal to half the diagonal angle measured in relation to the main axis. By superimposing an outer light port, a given window surface can be better exploited and can be protected from interference light entering from below.

18 Claims, 4 Drawing Figures

ARRANGEMENT FOR ILLUMINATING A ROOM WITH DAYLIGHT

BACKGROUND OF THE INVENTION

The invention relates to an arrangement for illuminating a room with daylight where, between an inlet window having an upper edge and a lower edge, and an inner window having an upper edge and a lower edge, an inner light port is provided.

An arrangement of this kind is known from German OS No. 14 97 348, incorporated herein by reference, wherein a plurality of flat reflectors are arranged at an interval one above another between two window panes. Two adjacent reflectors in each case form a light port, the cross-section of which is constant along its width. The diagonal angle between a diagonal beam passing through the light port and a reference plane, e.g. the vertical plane, here is such that even a person seated directly at the window can look through the light ports into the open air and their eyes will meet with multiply reflected beams.

From virtually all normal angles of vision of a person in the room, such a window appears very bright, i.e. its luminance is in sharp contrast with the luminance of the walls which surround the window.

From Swiss Patent No. 194 867, incorporated herein by reference, it is known to direct the bright Zenith light to the work station by deflecting it via mirrored reflectors and/or refractive discs. As a result, when viewed from the work station, the inner window has a particularly high luminance, which is particularly disturbing in rooms equipped with video work stations.

SUMMARY OF THE INVENTION

It is an object of the invention, in an arrangement as described in German OS No. 14 97 348, to design each light port in such manner that the entire light which passes through the light port is directed into an area of the room above a diagonal angle chosen such that the diagonal beam is no longer visible to a person seated at a work station furthest removed from the window.

In accordance with the invention, the lower reflector is formed in cross-section and is part of a parabola whose main axis passes through the upper edge of the inlet window and which defines with a vertical plane an acute main axis angle which is open towards the ceiling of the room. An angle of inclination of the upper reflector of the inner light port is at a maximum equal to half the diagonal angle, where the angle of inclination and the diagonal angle are measured from the main axis of the parabola. A tangent to the lower reflector in the lower edge of the inner window extends parallel to the upper reflector. The ceiling of the room is designed to be reflective. In the invention, the light is directed into the room at angles which are such that the inner windows appear dark, even from the most unfavorable viewing position. On the other hand, the ceiling, which is designed to be reflective, and the walls opposite the light ports, are brightly illuminated and thus act as secondary radiators which reflect the light towards the work station at favorable angles. Illumination of this kind not only saves energy but, in particular, also provides an extremely favorable, glare-free work situation. Disturbing reflections on video equipment are also avoided in this way.

With the invention, it is possible to vary within wide limits the distribution of the light flux from a light port over the ceiling and the walls opposite the window, and also, in particular, the angle at which the light enters the room above the diagonal angle. Thus, for example, the light flux which is directed rowards the area of the ceiling close to the window can be adjusted by a main axis angle which differs from zero. On the other hand, the area of the ceiling located further back in the room receives a greater proportion of light, the smaller the angle of inclination of the flat upper reflector.

A further degree of freedom is achieved by selecting the focal length of the lower reflector to be equal to, smaller than, or greater than the height of the inlet window.

It is within the scope of the invention to arrange the inner window of the inner light port or the inner windows of a plurality of inner light ports, one above another, in the same plane. This plane can extend vertically or can form with the vertical an acute angle which is open at the bottom. In the same way, the inlet window of each light port can be arranged in a vertical plane or in a plane inclined towards the vertical.

The invention results in an excellent screening of the room beneath the diagonal beam, but only under the condition that no interference light resulting from structural reflections can enter the light ports at an unfavorable angle. If this seems likely due to the structural situation, it is advantageous, in accordance with the further development of the invention, to arrange in front of each inner light port an outer light port which gates out interference light entering from below. This embodiment also permits an optimum exploitation of a given window area since the light inlet surfaces of the outer light ports meet without gaps. Similar considerations to those already explained in association with the inner light port apply to the parameters of the outer light port and to the deflection and gating out of light which can be achieved therewith. The parameters of the light ports can be constructed such that the light which enters in the angular range between the diagonal beam and the main axis of the outer light port is directed into the interior of the room within an angular range which is itself defined by the diagonal beam and the main axis of the inner light port.

Preferably light ports arranged one above another—which can also consist of an inner light port and an outer light port—are formed by identical molded units arranged one above another. The width of these can be sufficiently small to enable them to be accommodated in the interspace between the panes of composite windows. With such small dimensions, it is particularly advantageous to extrude the individual molded units.

For most applications it will be sufficient to use molded units which are symmetrical to a certain plane, thus resulting in inner light ports and outer light ports whose cross-section are laterally reversed.

Within the scope of the invention it is expedient to arrange beneath the light ports, approximately at the eye level of persons seated at work stations, at least one viewing window which permits contact with the outside world. However, the viewing window can also be covered with a blind.

It is also expedient to arrange a sun-shield in front of the light ports in order to withhold direct sunlight from the light ports, for example by means of retro-reflection.

DESCRIPTION OF THE PREFERRED EMBODIMENTS

Figure 1:
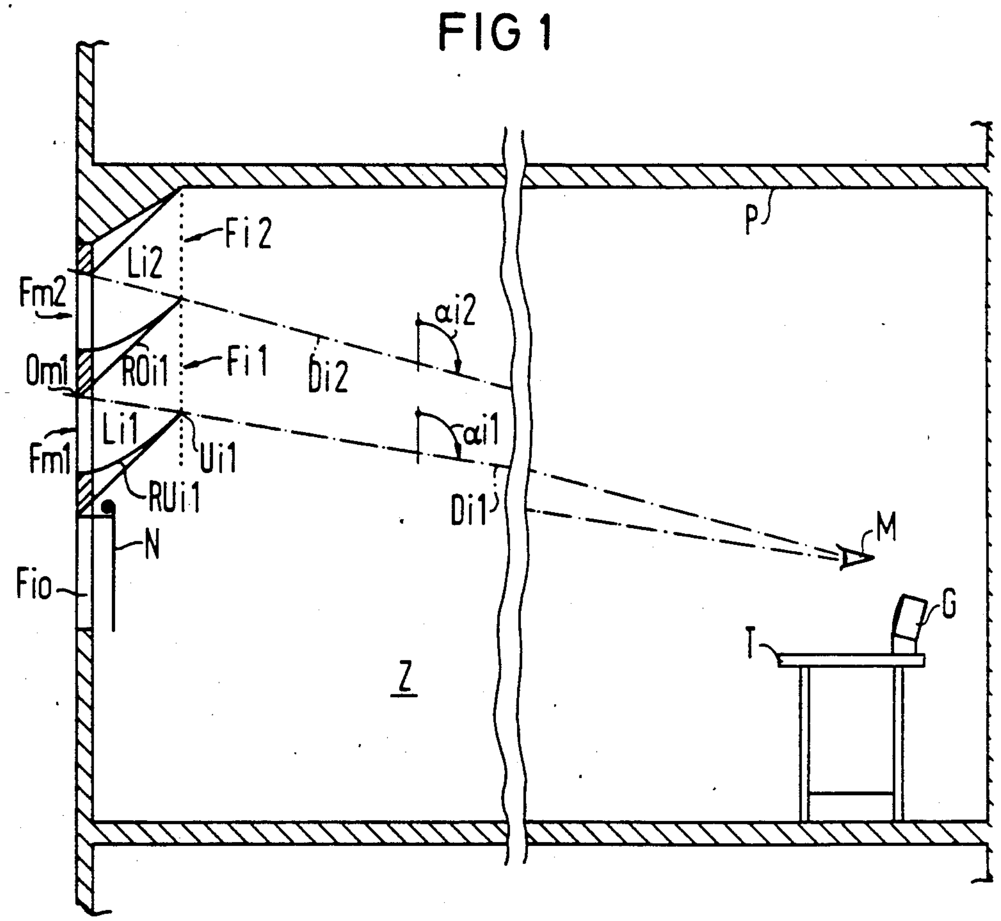
FIG. 1 is a cross-section through a room containing inner light ports arranged and designed in accordance with the invention.

The room shown in cross-section in FIG. 1 contains, in its left-hand external wall, a window (not referenced in detail) divided into subsidiary areas by internal built-in components.

First, a viewing window Fio is arranged approximately at the eye level M of a person seated at a desk T, and can be darkened by a blind N. Above the viewing window are arranged two inner light ports Li1, Li2, the vertical light outlet surfaces of which, facing towards the room, will be referred to as inner windows Fi1, Fi2. Accordingly, the light inlet surfaces which face outwardly will be referred to as inlet windows Fm1 and Fm2.

The diagonal beam Di1 assigned to the light port Li1, and which passes through the lower edge Ui1 of the inner window Fi1 and the upper edge Om1 of the inlet window Fm1, forms with the vertical a diagonal angle $\alpha i1$ which is somewhat greater than 90° and is constructed to be such that this diagonal beam is not visible at the eye level M of a person seated at a desk T furthest removed from the front of the window. Thus, the diagonal beam Di defines or limits the area directly illuminated by a light port from an underlying shielded zone Z illuminated only by daylight, and which has been reflected by the reflective ceiling P and/or the vertical walls of the room. This light produces virtually no disturbing reflection on a video device G.

Figure 2:
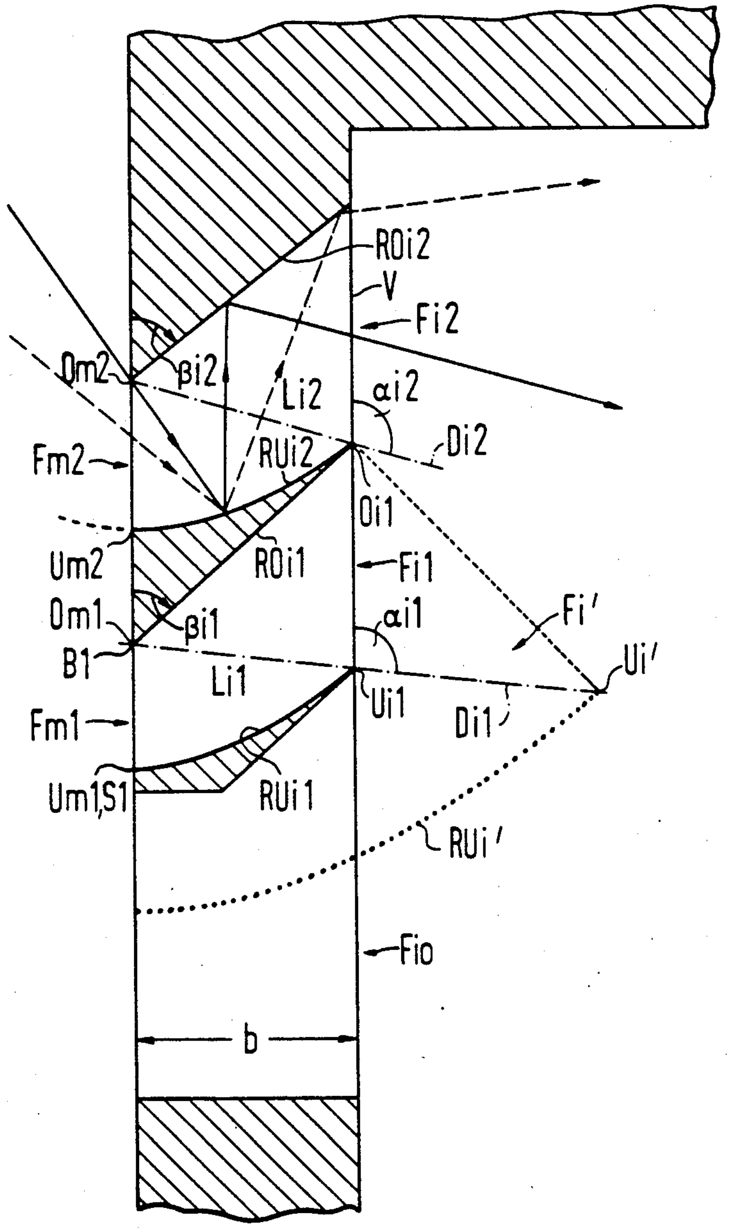
FIG. 2 is an enlarged cross-section through inner light ports of this kind.
Figure 3:
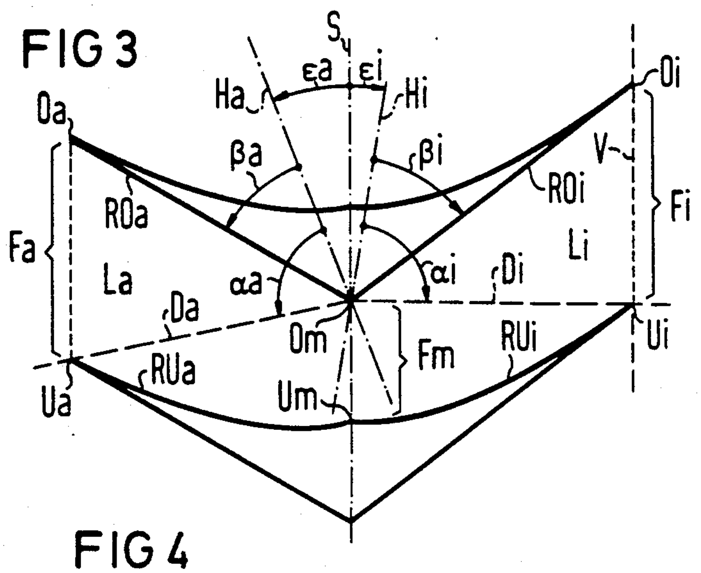
FIG. 3 is a schematic cross-section through an exemplary embodiment in which an outer light port has been placed in front of the inner light port.

The formation laws and effect of a light port in accordance with the invention will be explained in detail, making reference to FIG. 2 and FIG. 3. In FIG. 2 it has been assumed that the inlet windows Fm1, Fm2, and the inner windows Fi1, Fi2, are located in vertical planes V transversely spaced from one another by the distance b.

On the basis of the room situation illustrated in FIG. 1, the diagonal beam Di1, with the diagonal angle $\alpha i1$, is now represented for the lowest light port Li1. This determines the position of the lower edge Ui1 of the inner window Fi1 and of the upper edge Om1 of the inlet window Fm1.

Here, the lower reflector RUi1 has been arranged in such manner that the parabola of the path of this reflector has a vertical main axis and its focal point B1 lies in the lower edge Om1 of the inlet window Fm1. Thus, the diagonal beam Di1 is a focal beam and the distance between the focal point B1 and the lower edge Ui1 of the inner window Fi1 is equal to the distance of Ui1 in the vertical direction from the associated directrix of the parabola. Half the distance of this directrix from the focal point B1 then results in the vertex S1.

The focal length which is identical to the height of the inlet window Fm is governed by $$\frac{b}{2} \cdot \frac{1 + \sin(\alpha i - 90^\circ)}{\cos(\alpha i - 90^\circ)}$$

The angle of inclination $\beta i1$ of the flat upper reflector ROi1 is equal to half the diagonal angle $\alpha i1$, where both angles are measured from the vertical main axis.

On the basis of the upper light port Li2, constructed in accordance with the same principle, it can be seen how focal beams are deflected into the room in parallel at the diagonal angle $\alpha i2$.

Light beams which hit the lower reflector RUi2, and do not pass through the focal point, are all reflected into the room at an angle which is smaller than the diagonal angle $\alpha i2$, as can be seen from the broken line path of the beam.

Because of the position of the diagonal beam Di2, all light which directly enters the room through the light port must also have an angle which is smaller than the diagonal angle $\alpha i2$.

Where a plurality of light ports are arranged one above another, it is possible for these light ports to be of identical design, and in fact identical to the lowest light port. On the basis of the room situation which has been explained with reference to FIG. 1, strictly speaking a different diagonal angle occurs for each light port. Since this diagonal angle increases in size in accordance with the height of the light port, larger inlet and inner windows Fm2, Fi2 result.

FIG. 2 also shows a light port limited by a lower reflector RUi'—shown in dotted lines—where the inner window Fi' lies in a plane which forms with the vertical V an acute angle open at the bottom. Obviously this design permits the provision of larger window areas with identical screening conditions.

In the embodiment shown in FIG. 2, the inlet window of each light port receives light from an angle in the region of 180°. This can prove disturbing when lower structural components serve as secondary radiators. In such a case, it is expedient to limit the angular range of incoming light by means of an outer light port positioned in front of the inner light port, as can be seen from FIG. 3. Inner window Fi and inlet window Fm of the inner port Li are located—as in the case of FIG. 2—in two vertical planes V and S which are parallel to one another. In contrast to FIG. 2, the main axis Hi of the lower reflector Rui is inclined by the main axis angle $\epsilon i$ in relation to the vertical plane S.

The outer light port La is located between an outer window Fa having an upper edge Oa and a lower edge Ua, and the inlet window Fm of the inner light port Li. Between the lower edge Ua of the outer window Fa and the lower edge Um of the inlet window Fm of the inner light port Li, there is located a lower reflector RUa, the path of which is a parabola whose focal point B is located in the upper edge Om of the inlet window Fm, and whose main axis Ha is inclined by the main axis angle $\epsilon a$ in relation to the vertical plane S.

Between the upper edge Oa of the outer window Fa and the upper edge Om of the inlet window Fm there is arranged a flat upper reflector ROa inclined by an angle $\beta a$ in relation to the main axis Ha.

The diagonal beam Da passes through the lower edge Ua of the outer window Fa and the upper edge Om of the inlet window Fm, and forms an angle of inclination $\alpha a$ with the main axis Ha. The outer light port La only receives light which it deflects into the inner light port, provided the angle of incidence thereof is within the angular range $\alpha a$. This light is then radiated into the room within an angular range $\alpha i$ between the diagonal Di and the main axis Hi of the inner light port Li.

Figure 4:
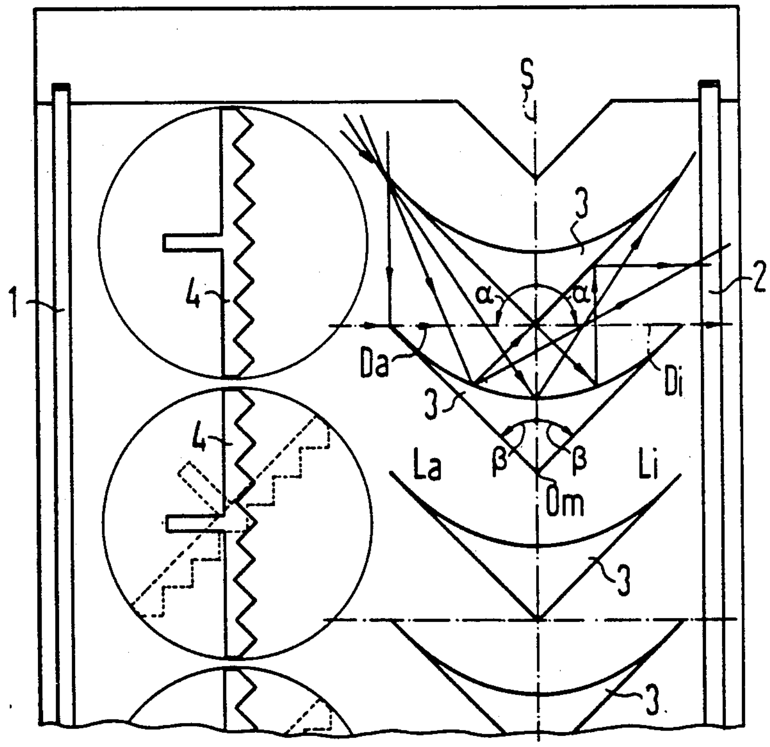
FIG. 4 is a cross-section through part of a composite window equipped with light ports of a particularly simple and efficient design.

The embodiment of the invention shown in FIG. 4 represents part of a composite window in cross-section, where the two window panes arranged parallel to one another have been referenced 1 and 2. Arranged between these panes at an equal interval one above another are molded units 3 of identical cross-section which are also designed to be laterally inverted in relation to a vertical plane S—parallel to the window panes. The surfaces of the molded units are reflective, and in particular are mirrored, so that an outer light port La and an inner light port Li are formed between molded units arranged one above another. The diagonal angles $\alpha$ for the diagonal beam D for the outer light port and the inner light port are identical and amount to 90° relative to the vertical plane S in which the main axes of the parabola of the lower reflectors are also located. Thus, the upper reflectors also have an identical angle of inclination $\beta$ of 45°.

An arrangement equipped with molded units of this type receives light from an angle in the region of 90°—between D and S—which it directs via the same angular range—between D and S—towards the ceiling and the opposite walls of the room.

In order to gate-out direct sunshine, between the light ports and the outer window pane 1 there is arranged a sunshield 4, known per se, in the form of rotatable prismatic discs which, regardless of the position of the sun, can always be adjusted so that none of the sun's rays can penetrate into the light ports.

Although various minor changes and modifications might be proposed by those skilled in the art, it will be understood that we wish to include within the scope of the patent warranted hereon all such changes and modifications as reasonably come within our contribution to the art.

We claim as our invention:

1. An arrangement for illuminating a room with daylight, comprising:
- an inlet window having an upper edge and a lower edge;
- an inner window having an upper edge and a lower edge;
- the inlet window lower edge and the inner window lower edge being parallel;
- between the inlet window and inner window an inner light port whose cross-section is constant along its width and which is limited by a lower reflector which extends between lower edges of the inlet window and inner window and by a flat upper reflector which extends between the inner window and inlet window upper edges;
- a diagonal beam having a diagonal angle $\alpha i$ which passes through the lower edge of the inner window and the upper edge of the inlet window;
- the lower reflector being formed in cross-section as part of a parabola whose main axis passes through the upper edge of the inlet window and which defines with a vertical plane an acute main axis angle $\epsilon i$ which is open towards a ceiling of the room;
- an angle of inclination of the upper reflector of the inner light port is at a maximum equal to half the diagonal angle $\alpha i$ where the angle of inclination $\beta i$ and the diagonal angle $\alpha i$ are measured from the main axis of the parabola;
- a tangent to the lower reflector in the lower edge of the inner window extending parallel to the upper reflector; and
- the ceiling of the room being reflective.

2. An arrangement according to claim 1 wherein the inner window is located in a plane which forms with the vertical plane an acute angle which is open at the bottom.

3. An arrangement according to claim 2 wherein a plurality of inner light ports are arranged one above another and all the inner windows are arranged in a plane which forms with the vertical plane an acute angle which is open at the bottom.

4. An arrangement according to claim 1 wherein the inner windows are arranged in the vertical plane.

5. An arrangement according to claim 1 wherein the inlet window of the inner light port is located in a vertical plane.

6. An arrangement according to claim 1 wherein the inlet window is located in a plane which forms with the vertical an acute angle open at the bottom.

7. An arrangement according to claim 4 wherein the inner windows and the inlet windows are located in different vertical planes with a transverse spacing therebetween.

8. An arrangement according to claim 7 wherein the main axis angle $\epsilon i$ of the parabola of the path of the lower reflector is zero and a focal length is governed by the equation $$\frac{b}{2} \cdot \frac{1 + \sin(\alpha i - 90°)}{\cos(\alpha i - 90°)}$$

where $\alpha i$ is the diagonal angle, and b is the transverse spacing between the vertical planes, and wherein an angle of inclination $\beta i$ of the upper reflector is equal to half the diagonal angle $\alpha i$.

9. An arrangement according to claim 5 wherein:
- between an outer window having an upper edge and a lower edge and the inlet window of the inner light port there is arranged an outer light port having a flat upper reflector and a lower reflector;
- the lower reflector extending between the lower edge of the outer window and the lower edge of the inlet window and in cross-section forming part of a parabola whose main axis passes through the upper edge of the inlet window and forms with the vertical plane an acute main axis angle $\alpha a$ which is open above;
- the upper reflector extending between the upper edge of the outer window and the upper edge of the inlet window;
- the angle of inclination $\beta a$ of the upper reflector measured from the main axis being equal to half the diagonal angle $\alpha a$ of a diagonal beam of the outer light port;
- the diagonal beam passing through the lower edge of the outer window and the upper edge of the inlet window; and
- the diagonal angle $\alpha a$ being measured from the main axis.

10. An arrangement according to claim 9 including the provision of a plurality of light ports arranged one above another, the outer windows being arranged in a plane which forms, with a vertical plane, an acute angle which is open at the bottom.

11. An arrangement according to claim 9 including the provision of a plurality of light ports arranged one above another, the outer windows being arranged in a vertical plane which extends at an interval parallel to the plane of the inlet windows, and a focal point of the lower reflector being located on the upper edge of the inlet window.

12. An arrangement according to claim 11 wherein cross-sections of the inner light port and the outer light port are laterally inverted in relation to a vertical plane of symmetry in which the inlet windows of the inner light ports are located.

13. An arrangement according to claim 12 wherein the main axis angles $\epsilon a$, $\epsilon i$ of the lower reflectors are equal to zero.

14. An arrangement according to claim 1 wherein a plurality of light ports are arranged one above another, the inner light ports being arranged in such manner and having a diagonal angle $\alpha i$ such that a person seated at a work station furthest removed from the window is unable to perceive at eye level a light beam emanating from an inner window.

15. An arrangement according to claim 14 wherein a viewing window located beneath the light ports at the eye level of persons seated at work stations and the viewing window can be covered by a blind.

16. An arrangement according to claim 1 wherein a sunshield is arranged in front of the inlet windows.

17. An arrangement according to claim 1 wherein the light ports are limited by molded units arranged one above another, have an identical cross-section, and are provided with reflective surfaces.

18. An arrangement according to claim 1 wherein a sunshield is arranged in front of the outer windows.

* * * * *